(12) United States Patent
Ashiba

(10) Patent No.: US 11,274,724 B2
(45) Date of Patent: Mar. 15, 2022

(54) BUFFER

(71) Applicant: Hitachi Astemo, Ltd., Ibaraki (JP)

(72) Inventor: Masahiro Ashiba, Ibaraki (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 9 days.

(21) Appl. No.: 16/616,634

(22) PCT Filed: May 24, 2018

(86) PCT No.: PCT/JP2018/019970
§ 371 (c)(1),
(2) Date: Nov. 25, 2019

(87) PCT Pub. No.: WO2018/216762
PCT Pub. Date: Nov. 29, 2018

(65) Prior Publication Data
US 2020/0191230 A1    Jun. 18, 2020

(30) Foreign Application Priority Data

May 26, 2017   (JP) .............................. JP2017-104884

(51) Int. Cl.
*F16F 9/36* (2006.01)
*F16F 9/18* (2006.01)
*B60G 13/08* (2006.01)

(52) U.S. Cl.
CPC .............. *F16F 9/364* (2013.01); *F16F 9/185* (2013.01); *B60G 13/08* (2013.01);
(Continued)

(58) Field of Classification Search
CPC .. F16F 9/185; F16F 9/363; F16F 9/364; F16F 9/365; F16F 2230/30; B60G 13/08; B60G 2202/24; B60G 2206/41
See application file for complete search history.

(56) References Cited

U.S. PATENT DOCUMENTS 4,542,811 A * 9/1985 Miura ..................... F16F 9/364
188/315
4,653,618 A    3/1987 Churchill et al.
(Continued)

FOREIGN PATENT DOCUMENTS

JP       04-105648 U    9/1992
JP       2597265 Y      7/1999
(Continued)

OTHER PUBLICATIONS

International Search Report dated Jul. 24, 2018 for WO 2018/216762 A1.
(Continued)

*Primary Examiner* — Melody M Burch
(74) *Attorney, Agent, or Firm* — Abelman, Frayne & Schwab

(57) ABSTRACT

A buffer includes a first seal portion, a second seal portion, a washer, and a bent portion. An annular body is provided between the washer and a rod guide, the first seal portion is provided on the inner peripheral side of the washer, or the inner peripheral side of the annular body, and the rod guide and an outer cylinder are radially spaced apart from each other at least on one end side of the outer cylinder. The outer peripheral side of the annular body has a bent portion bent and extending to the portion where the rod guide and the outer cylinder are radially spaced apart from each other, and the second seal portion is provided on the outer peripheral side of the bent portion.

4 Claims, 5 Drawing Sheets

(52) U.S. Cl.
CPC ...... *B60G 2202/24* (2013.01); *B60G 2206/41* (2013.01); *F16F 2230/30* (2013.01)

(56) References Cited

U.S. PATENT DOCUMENTS

| | | | | |
|---|---|---|---|---|
| 5,178,243 | A * | 1/1993 | Hamada | F16F 9/3242 |
| | | | | 188/315 |
| 6,622,832 | B2 * | 9/2003 | Ashiba | F16F 9/365 |
| | | | | 188/315 |
| 6,644,446 | B2 * | 11/2003 | Kachi | F16F 9/3242 |
| | | | | 188/284 |
| 8,079,598 | B2 * | 12/2011 | Murakami | F16F 9/363 |
| | | | | 277/552 |

FOREIGN PATENT DOCUMENTS

| | | |
|---|---|---|
| JP | 2002-242981 A | 8/2002 |
| JP | 2005-090606 A | 4/2005 |
| JP | 2006-010050 A | 1/2006 |
| JP | 2011-214633 A | 10/2011 |
| JP | 2016-033410 A | 3/2016 |

OTHER PUBLICATIONS

An Office Action dated Dec. 21, 2020, issued from the Korean Intellectual Property Office (KIPO) of Korean Patent Application No. 10-2019-7034610 and an English translation thereof (12 pages).

* cited by examiner

BUFFER

CROSS REFERENCE TO RELATED APPLICATIONS

This application is a national phase of PCT application No. PCT/JP2018/019970, filed on 24 May 2018, which claims priority from Japanese patent application No. 2017-104884, filed on 26 May 2017, all of which are incorporated herein by reference.

TECHNICAL FIELD

The present disclosure relates to a buffer.

The present application is based on and claims priority from Japanese Patent Application No. 2017-104884 filed on May 26, 2017, the disclosure of which is incorporated herein it its entirety by reference.

BACKGROUND

There is a technique of providing a communication path from a cylinder to a reservoir in a rod guide (see, e.g., Patent Document 1). In addition, there is a technique of providing a guide member in order to align a reinforcement washer (see, e.g., Patent Document 2).

PRIOR ART DOCUMENT

Patent Document
Patent Document 1: Japanese Laid-Open Utility Model Publication No. 04-105648
Patent Document 2: Japanese Laid-Open Patent Publication No. 2016-033410

SUMMARY OF THE INVENTION

Problem to be Solved

Recently, the weight reduction of a buffer is desired.
Accordingly, an object of the present disclosure is to provide a buffer that can be reduced in weight.

Means to Solve the Problem

In order to achieve the object described above, according to an aspect of the present disclosure, a buffer includes: a cylindrical rod guide provided on one end side of the inner cylinder so as to slidably guide the piston rod; a first seal portion provided on the one end side of the rod guide within the outer cylinder and configured to seal an outer peripheral side of the piston rod; a second seal portion provided on the one end of the rod guide within the outer cylinder and configured to seal the inner peripheral side of the outer cylinder; a washer provided on the one end side of the rod guide within the outer cylinder; and a bent portion formed by bending an one end side of the outer cylinder radially inward toward the washer and configured to fix the washer. An annular body is provided between the washer and the rod guide in an axial direction, the first seal portion is provided on an inner peripheral side of the washer or an inner peripheral side of the annular body, the rod guide and the outer cylinder are radially spaced apart from each other at least on the one end side of the outer cylinder, an outer peripheral side of the annular body has a bent portion bent and extending in a portion where the rod guide and the outer cylinder are radially spaced apart from each other, and the second seal portion is provided on an outer peripheral side of the bent portion.

Effect of the Invention

According to the present disclosure, weight reduction is enabled.

DETAILED DESCRIPTION TO EXECUTE THE INVENTION

First Embodiment

A buffer according to a first embodiment of the present disclosure will be described below with reference to FIGS. 1 and 2.

Figure 1:
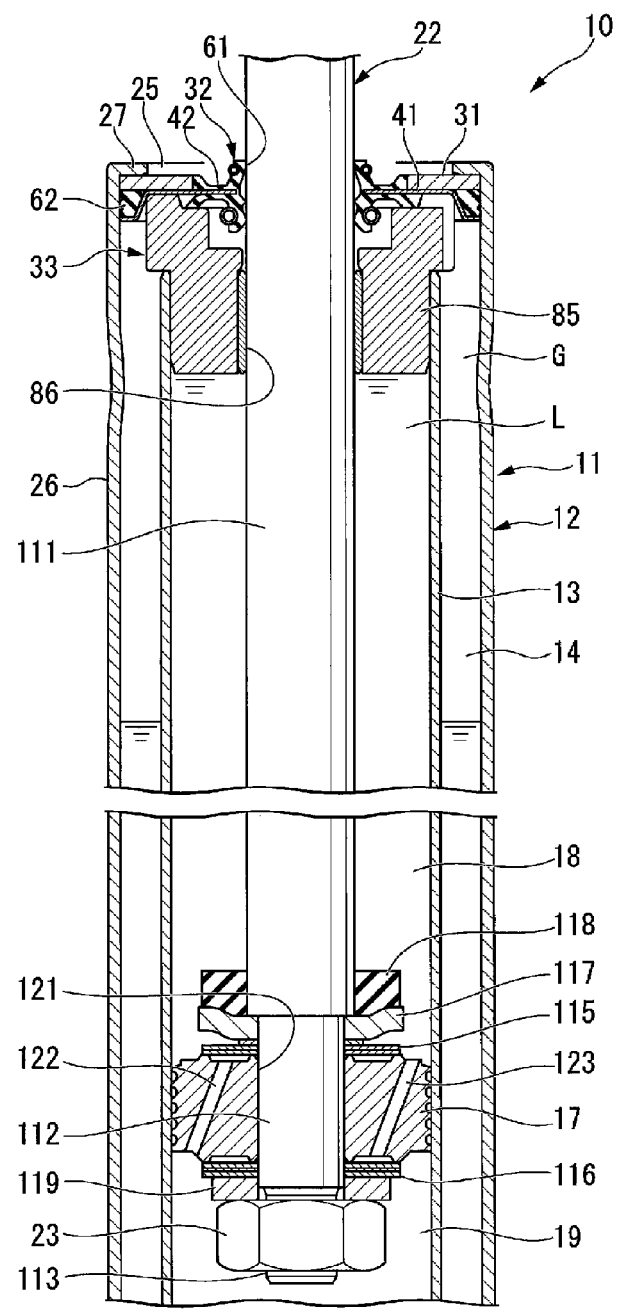
FIG. 1 is a partial cross-sectional view illustrating a buffer according to a first embodiment of the present disclosure.

The buffer 10 according to the first embodiment illustrated in FIG. 1 is used in a suspension apparatus for an automobile or a railway vehicle. The buffer 10 has a cylinder 11. The cylinder 11 includes an outer cylinder 12 configured to enclose a working fluid therein, and an inner cylinder 13 configured to enclose a working fluid therein and having a diameter smaller than that of the outer cylinder 12. The inner cylinder 13 is provided coaxially on the inner peripheral side of the outer cylinder 12. An annular reservoir 14 is formed between the inner cylinder 13 and the outer cylinder 12. That is, the buffer 10 has a double cylinder structure in which the annular reservoir 14 is formed between the inner cylinder 13 and the outer cylinder 12.

The buffer 10 has a piston 17 slidably fitted in the inner cylinder 13. The piston 17 defines an upper chamber 18 and a lower chamber 19 in the inner cylinder 13. Specifically, in the cylinder 11, a hydraulic liquid L as a working fluid is enclosed in the upper chamber 18 and the lower chamber 19, and a hydraulic liquid L and a gas G as a working fluid are enclosed in the reservoir 14.

The buffer 10 has a piston rod 22. The piston rod 22 protrudes outwards at one axial end side thereof from one end of the cylinder 11 in the axial direction (the vertical direction in FIGS. 1 to 5 (hereinafter, referred to as a "cylinder axis direction"), that is, from one end of the inner cylinder 13 and the outer cylinder 12, and is inserted into the inner cylinder 13 and connected to the piston 17 at the other axial end side thereof. The piston 17 is fastened to the end of the piston rod 22 in the inner cylinder 13 by a nut 23 and moves integrally with the piston 17.

The outer cylinder 12 has a bottomed cylindrical shape having a cylindrical barrel portion 26 from which the piston rod 22 protrudes from an opening 25 at one end in the cylinder axis direction, and an end portion (not illustrated) that closes the end opposite to the protruding side of the piston rod 22 in the barrel portion 26. The outer cylinder 12 has a bent portion 27 that is bent over the entire circumference radially inward of the barrel portion 26 at the position of the opening 25 of the barrel portion 26. The bent portion 27 may have a structure that is partially caulked at three or more locations.

At the one end side in the cylinder axis direction from which the piston rod 22 protrudes, the buffer 10 includes an annular washer 31 that abuts on the bent portion 27, an annular seal member 32 that abuts on the washer 31, and a cylindrical rod guide 33 that abuts on the seal member 32. The washer 31, the seal member 32, and the rod guide 33 are arranged coaxially. The piston rod 22 is slidably inserted through the respective radially inner sides of the rod guide 33 and the seal member 32, and inserted through the washer 31 with a gap therebetween radially inside the washer 31.

The seal member 32 is provided on the outer side (the upper side in the vertical direction in FIG. 1) of the rod guide 33 in the inward and outward directions of the cylinder 11 (the vertical direction in FIGS. 1 to 5 (hereinafter, referred to as a "cylinder inward-outward direction") in the cylinder axis direction. In other words, the rod guide 33 is provided on the inner side (lower side in the vertical direction in FIG. 1) of the seal member 32 in the cylinder inward-outward direction. The washer 31 is provided on the outer side of the seal member 32 in the cylinder inward-outward direction. In other words, the seal member 32 is provided on the inner side of the washer 31 in the cylinder inward-outward direction.

The washer 31 has a flat perforated-disc shape made of metal. The outer circumferential surface of the washer 31 is fitted to the barrel portion 26 of the outer cylinder 12, and the outer surface of the washer 31 on the outer side in the cylinder inward-outward direction abuts on the inner surface of the bent portion 27 on the inner side in the cylinder inward-outward direction. Therefore, the bent portion 27 provided on the one end side from which the piston rod 22 of the outer cylinder 12 protrudes (that is, the outer side in the cylinder inward-outward direction) is bent inward in the radial direction toward the washer 31. In other words, the bent portion 27 fixes the washer 31 by bending one end side of the outer cylinder 12 inward in the radial direction toward the washer 31. The washer 31 is positioned in the radial direction, that is, centered with respect to the outer cylinder 12 by being fitted to the barrel portion 26 of the outer cylinder 12.

The seal member 32 is an integrally molded product in which a rubber elastic body 42 is baked on a metal annular body 41. The elastic body 42 is made of a rubber material having good slidability such as, for example, nitrile rubber or fluorine rubber.

Figure 2:
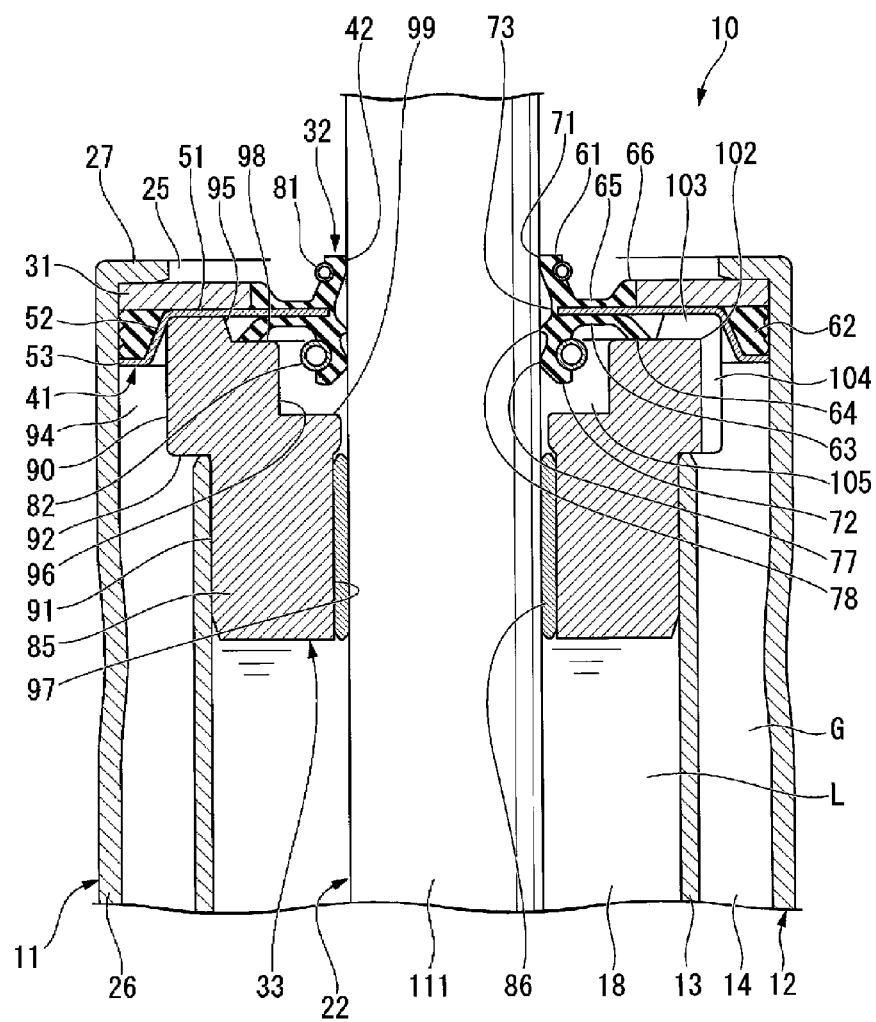
FIG. 2 is a partially enlarged cross-sectional view illustrating the buffer according to the first embodiment of the present disclosure.

As illustrated in FIG. 2, the annular body 41 is press-molded from a metal plate material having a predetermined thickness, and includes a perforated-disc-shaped substrate portion 51, a bent cylindrical portion (bent portion) 52 bent and extending to the inner side in the cylinder inward-outward direction from the outer peripheral portion of the substrate portion 51, and a perforated-disc-shaped outer peripheral plate portion 53 extending radially outward from the end edge of the bent cylindrical portion 52 on the inner side in the cylinder inward-outward direction. The substrate portion 51, the bent cylindrical portion 52 and the outer peripheral plate part 53 are arranged coaxially. The bent cylindrical portion 52 has a tapered cylindrical shape having a larger diameter on the outer peripheral plate portion 53 side than on the substrate portion 51 side in the axial direction.

In the seal member 32, the outer circumferential surface of the outer peripheral plate portion of the annular body 41 is fitted to the barrel portion 26 of the outer cylinder 12, and the outer surface of the substrate portion 51 on the outer side in the cylinder inward-outward direction abuts on the inner surface of the washer 31 on the inner side in the cylinder inward-outward direction. The annular body 41 maintains the shape of the elastic body 42, and positions the seal member 32 in the radial direction with respect to the outer cylinder 12 by being fitted to the outer cylinder 12. In other words, the seal member 32 is positioned in the radial direction, that is, centered with respect to the outer cylinder 12 by the annular body 41. Here, the metal washer 31 described above is intended to reinforce the lack of rigidity due to the metal annular body 41, and has a two-plate structure in which the washer 31 and the annular body 41 directly overlap each other, thereby reinforcing the seal member 32.

The elastic body 42 includes: a rod seal portion 61 (a first seal portion) that is provided on the inner peripheral side of the substrate portion 51 of the annular body 41, that is, on the inner peripheral side of the annular body 41, and seals the outer peripheral side of the piston rod 22; and an outer cylinder seal portion 62 (a second seal portion) that is provided on the radially outer side of the bent cylindrical portion 52 of the annular body 41 and on the outer side of the outer peripheral plate portion 53 in the cylinder inward-outward direction and seals the inner peripheral side of the outer cylinder 12. The elastic body 42 includes: an annular inner surface covering portion 63 and an annular check lip 64 provided on the inner side of the substrate portion 51 in the cylinder inward-outward direction; and an annular outer surface covering portion 65 and an annular fitting portion 66 provided on the outer side of the substrate portion 51 in the cylinder inward-outward direction. In the elastic body 42, the rod seal portion 61, the inner surface covering portion 63, the check lip 64, the outer surface covering portion 65, and the fitting portion 66 are integrated, and are integrally provided on the annular body 41 in the state in which these portions are separated from the outer cylinder seal portion 62.

The rod seal portion 61 is provided in the outer cylinder 12 on the one end side from which the piston rod 22 of the rod guide 33 protrudes (that is, the outer side in the cylinder inward-outward direction). The rod seal portion 61 includes a dust lip 71 provided on the outer side in the cylinder inward-outward direction, an oil lip 72 provided on the inner side in the cylinder inward-outward direction, and an inner periphery covering portion 73 provided between the dust lip 71 and the oil lip 72.

The dust lip 71 has an annular cylindrical shape, and extends in a tapered shape from the inner peripheral side of the substrate portion 51 of the annular body 41 to the outer side in the cylinder inward-outer direction. The base end surface of the dust strip 71, which is in contact with the substrate portion 51 of the annular body 41, is entirely bonded to the outer surface of the substrate portion 51 on the outer side in the cylinder inward-outward direction over the entire circumference thereof.

The oil lip 72 includes: an oil lip body 77 having an annular cylindrical shape and extending in a tapered shape from the inner peripheral side of the base plate portion 51 of the annular body 41 to the inner side in the cylinder inward-outward direction; and an annular intermediate lip portion 78 protruding radially inward from an axial intermediate position of the oil lip body 77. The base end surface of the oil lip body 77, which is in contact with the substrate portion 51 of the annular body 41, is entirely bonded to the inner surface of the substrate portion 51 on the inner side in the cylinder inward-outward direction over the entire circumference thereof.

The inner periphery covering portion 73 has an annular shape, and connects the dust lip 71 and the oil lip 72 while covering the inner peripheral side of the substrate portion 51 of the annular body 41. The outer peripheral surface of the inner periphery covering portion 73, which is in contact with the inner peripheral surface of the substrate portion 51 of the annular body 41, is entirely bonded to the inner peripheral surface of the substrate portion 51 over the entire circumference thereof.

The inner surface covering portion 63 has an annular shape, extends radially outward from the base end side of the oil lip body 77, and connects the oil lip 72 and the check lip 64. The surface of the inner surface covering portion 63, which is in contact with the substrate body 51 of the annular body 41, is entirely bonded to the inner surface of the substrate portion 51 on the inner side in the cylinder inward-outward direction over the entire circumference thereof, and partially covers this inner surface.

The check lip 64 has an annular shape, and extends from the substrate portion 51 of the annular body 41 while the diameter thereof extends toward the inner side in the cylinder inward-outward direction. The surface of the check lip 64, which is in contact with the substrate portion 51 of the annular body 41, is entirely bonded to the inner surface of the substrate portion 51 on the inner side in the cylinder inward-outward direction over the entire circumference thereof.

The outer surface covering portion 65 has an annular shape, extends radially outward from the base end side of the dust rip 71, and connects the dust lip 71 and the fitting portion 66. The surface of the outer surface covering portion 65, which is in contact with the substrate body 51 of the annular body 41, is entirely bonded to the outer surface of the substrate portion 51 on the outer side in the cylinder inward-outward direction over the entire circumference thereof, and partially covers this outer surface.

The fitting portion 66 has an annular shape, and protrudes from the substrate portion 51 of the annular body 41 to the outer side of the outer surface covering portion 65 in the cylinder inward-outward direction. The surface of the fitting portion 66, which is in contact with the substrate portion 51 of the annular body 41, is entirely bonded to the outer surface of the substrate portion 51 on the outer side in the cylinder inward-outward direction over the entire circumference thereof.

Here, the washer 31 is provided in the outer cylinder 12 on the one end side from which the piston rod 22 of the rod guide 33 protrudes (that is, the outer side in the cylinder inward-outward direction). The fitting portion 66 is fitted to the washer 31, and at that time, the outer peripheral surface thereof is in close contact with the inner peripheral surface of the washer 31.

An annular spring 81 is mounted on the outer periphery of the dust lip 71, and an annular spring 82 is mounted on the outer periphery of the oil lip 72.

The outer cylinder seal portion 62 is provided in the outer cylinder 12 on the one end side from which the piston rod 22 of the rod guide 33 protrudes (that is, the outer side in the cylinder inward-outward direction). The surface of the outer cylinder seal portion 62, which is in contact with the bent cylindrical portion 52 of the annular body 41, is entirely bonded to the radially outer peripheral surface of the bent cylindrical portion 52 over the entire circumference thereof. In addition, the surface of the outer cylinder seal portion 62, which is in contact with outer peripheral plate portion 53 of the annular body 41, is entirely bonded to the outer surface of outer peripheral plate portion 53 on the outer side in the cylinder inward-outward direction over the entire circumference thereof.

In the seal member 32 in the state of being attached to the outer cylinder 12, the piston rod 22 is inserted through the insides of the dust lip 71, the inner periphery covering portion 73, and the oil lip 72. At that time, a portion of the dust lip 71 on the outer side in the cylinder inward-outward direction, a portion of the oil lip 72 on the inner side in the cylinder inward-outer direction, and the intermediate lip portion 78 come into contact with the outer peripheral surface of the piston rod 22 with interference. In this state, the piston rod 22 protrudes outward from the seal member 32, and the rod seal portion 61 on the inner peripheral side of the seal member 32 comes into contact with the outer peripheral portion of the piston rod 22 so as to seal the outer peripheral side of the piston rod 22. In addition, the outer cylinder seal portion 62 on the outer peripheral side of the seal member 32 comes into contact with the inner peripheral surface of the barrel portion 26 of the outer cylinder 12 with interference so as to seal the inner peripheral side of the outer cylinder 12. As a result, the seal member 32 closes the space between the outer cylinder 12 and the piston rod 22.

The spring 81 fitted to the dust lip 71 is for maintaining the fastening force of the dust lip 71 in the close contact direction to the piston rod 22 in a constant state, and is also used to adjust the fastening force so as to satisfy design specifications. The spring 82 fitted to the oil lip 72 adjusts the fastening force of the oil lip 72 in the close contact direction of the oil lip 72 to the piston rod 22. When the fastening forces of the dust lip 71 and the oil lip 72 satisfy the design specifications, the springs 81 and 82 may not be provided. In addition, only one of the springs 81 and 82 may be used.

The rod guide 33 is provided on the one end side of the inner cylinder 13 from which the piston rod 22 protrudes (that is, the outer side in the cylinder inward-outward direction), and guides the piston rod 22 to be slidable. The rod guide 33 includes a cylindrical rod guide body 85 made of a sintered metal and a cylindrical collar 86 fitted and fixed to the inner peripheral portion of the rod guide body 85. The rod guide 33 is attached to the inner cylinder 13 in the road guide body and guides the sliding of the piston rod 22 in the collar 86.

The outer peripheral side of the rod guide body 85 forms a shape in which a large-diameter outer peripheral portion 90 of which the outer peripheral surface forms a cylindrical surface is formed on one side in the axial direction, a small-diameter outer peripheral portion 91, of which the outer peripheral surface forms a cylindrical surface which is smaller in diameter than the large-diameter outer peripheral portion 90 on the other side in the axial direction, and a stepped portion 92 extending in the direction orthogonal to the axis thereof is formed between the large-diameter outer peripheral portion 90 and the small-diameter outer peripheral portion 91. The large-diameter outer peripheral portion 90, the small-diameter outer peripheral portion 91, and the stepped portion 92 are formed coaxially.

The rod guide 33 is arranged so as to provide a gap, that is, a separation portion 94, with respect to the outer cylinder 12 over the entire circumference and the entire length thereof. In other words, the maximum radius of the rod guide 33 is set to be smaller than the radius of the inner peripheral surface of the outer cylinder 12 such that a radial gap can be formed therebetween. In the rod guide body 85, the large-diameter outer peripheral portion 90 is inserted into the inside of the bent cylindrical portion 52 of the annular body 41 of the seal member 32, and abuts on the inner surface of the substrate portion 51 on the inner side in the cylinder inward-outward direction. In this state, the end portion of the rod guide 33 on the outer side in the cylinder inward-outward direction is fitted to the end portion, having the minimum inner diameter in the bent cylindrical portion 52, on the outer side in the cylinder inward-outward direction, and is radially positioned with respect to the annular body 41 of the seal member 32. In other words, the rod guide 33 does not come into direct contact with the outer cylinder 12, and is radially positioned, that is, centered with respect to the outer cylinder 12 only by the annular body 41 of the seal member 32 fitted to the outer cylinder 12 and radially positioned with respect to the outer cylinder 12.

Since the rod guide 33 is fitted to the bent cylindrical portion 52 of the annular body 41 of the seal member 32 in the large-diameter outer peripheral portion 90, in the seal member 32, the bent cylindrical portion 52 and the outer peripheral plate portion 53 of the annular body 41 and the outer cylinder seal portion 62 are disposed in the separation portion 94 over the entire circumferences thereof, and the bent cylindrical portion 52 is bent so as to extend from the outer peripheral side of the annular body 41 in the axial direction of the rod guide 33. The outer cylinder seal portion 62 is provided on the bent cylindrical portion 52. In other words, between the outer peripheral side of the rod guide 33 and the outer cylinder 12, the separation portion 94 where the bent cylindrical portion 52, the outer peripheral plate portion 53, and the outer cylinder seal portion 62 are arranged is provided over the entire circumference and entire length of the rod guide 33. In other words, the outer peripheral side of the annular body 41 has the bent cylindrical portion 52 that is bent and extends to a radially spaced portion between the rod guide 33 and the outer cylinder 12, and the outer cylinder seal portion 62 is provided on the outer peripheral side of the bent cylindrical portion 52.

In the rod guide body 85, the small-diameter outer peripheral portion 91 is fitted into the inner cylinder 13, and the stepped portion 92 abuts on the end of the inner cylinder 13 on the outer side in the cylinder inward-outward direction. Accordingly, the rod guide 33 is positioned in the radial direction and also positioned and fixed in the axial direction at the end of the inner cylinder 13 on the outer side in the cylinder inward-outward direction. Since the rod guide body 85 is fitted to the annular body 41 of the seal member 32 and positioned in the radial direction with respect to the outer cylinder 12, the rod guide 33 positions a portion of the inner cylinder 13, fitted thereto, on the outer side in the cylinder inward-outward direction coaxially with respect to the barrel portion 26 of the outer cylinder 12.

The inner peripheral side of the rod guide body 85 forms a shape in which a large-diameter inner peripheral portion 95 is formed on the outer side in the cylinder inward-outward direction, an intermediate inner peripheral portion 96 having a diameter smaller than that of the large-diameter inner peripheral portion 95 is formed on the inner side of the large-diameter inner peripheral portion 95 in the cylinder inward-outward direction, and a small-diameter inner peripheral portion 97 having a diameter smaller than that of the intermediate inner peripheral portion 96 is formed on the inner side of the intermediate inner peripheral portion 96 in the cylinder inward-outward direction, a stepped portion 98 extending in a direction orthogonal to the axis thereof is formed between the large-diameter inner peripheral portion 95 and the intermediate inner peripheral portion 96, and a stepped portion 99 extending in the direction orthogonal to the axis thereof is formed between the intermediate inner peripheral portion 96 and the small-diameter inner peripheral portion 97.

In the seal member 32, the inner surface of the substrate portion 51 of the annular body 41 on the inner side in the cylinder inward-outward direction abuts on the tip end surface of the rod guide 33 on the outer side in the cylinder inward-outward direction. In the seal member 32, the substrate portion 51 of the annular body 41 is provided between the washer 31 and the rod guide 33 in the axial direction, and is sandwiched between the washer 31 and the rod guide 33.

The rod guide body 85 has a communication path 102 formed between the tip end portion thereof on the outer side in the cylinder inward-outward direction and the outer peripheral portion of the large-diameter outer peripheral portion 90. The communication path 102 includes a radial groove 103 that radially penetrates the tip end portion of the rod guide body 85 on the outer side in the cylinder inward-outward direction, and an axial groove 104 axially penetrating the large-diameter outer peripheral portion 90 of the rod guide body 85, continuing from the radial groove 103. The communication path 102 communicates with the reservoir 14 between the outer cylinder 12 and the inner cylinder 13.

The collar 86 is fixedly fitted to the small-diameter inner peripheral portion 97 of the rod guide body 85, and the piston rod 22 is inserted into the collar 86 so as to be in sliding contact.

The check lip 64 of the seal member 32 is capable of sealing contact with the stepped portion 98 of the rod guide 33 over the entire circumference thereof with predetermined interference. Here, the hydraulic liquid L leaking from the gap between the rod guide 33 and the piston rod 22 is accumulated in a chamber 105 within the intermediate inner peripheral portion 96 on the gap side of the check lip 64. When the pressure in the chamber 105 becomes higher than the pressure in the reservoir 14 by a predetermined amount, the check lip 64 opens and causes the hydraulic liquid L accumulated in the chamber 105 to flow to the reservoir 14 via the communication path 102. That is, the check lip 64 functions as a check valve that allows the flow of the hydraulic liquid L and the gas G only in the direction from the chamber 105 to the reservoir 14 and restricts the flow in the reverse direction. The communication path 102 allows the hydraulic liquid L to flow from the chamber 105 to the reservoir 14 when the check lip 64 opens. The oil lip 72 and the spring 82 of the seal member 32 are disposed within the chamber 105.

A base valve (not illustrated) is provided in the bottom portion of the outer cylinder 12 opposite to the washer 31, the seal member 32, and the rod guide 33 in the cylinder axis direction within the outer cylinder 12. The base valve is placed on the bottom portion (not illustrated) of the outer cylinder 12 and is positioned in the radial direction with respect to the outer cylinder 12. The inner end of the inner cylinder 13 on the inner side in the cylinder inward-outward direction is fitted to the base valve, so that the portion of the inner cylinder 13 on the inner side in the inward-outward direction is positioned in the radial direction and also positioned in the axial direction so as to be coaxial with the barrel portion 26 of the outer cylinder 12.

As illustrated in FIG. 1, the end of the piston rod 22 disposed in the inner cylinder 13 is disposed on the central axis of the cylinder 11 by the piston 17 disposed in the inner cylinder 13. In addition, the intermediate portion of the piston rod 22 in the axial direction is disposed on the central axis of the cylinder 11 by the rod guide 33 fitted to the seal member 32 fitted to the outer cylinder 12. That is, the piston rod 22 is supported coaxially with the cylinder 11 by the piston 17, the seal member 32, and the rod guide 33.

As illustrated in FIG. 2, the rod guide 33 supports the piston rod 22 to be movable in the axial direction while restricting the radial movement of the piston rod 22. The outer cylinder seal portion 62 on the outer periphery of the seal member 32 is closely fitted to the inside of the outer cylinder 12 of the cylinder 11. The seal member 32 is inserted such that the piston rod 22 is in close contact with the rod seal portion 61 on the inner periphery thereof. Thus, the seal member 32 closes the opening 25 on one end side from which the piston rod 22 of the cylinder 11 protrudes (that is, the outer side in the cylinder inward-outward direction), and the hydraulic liquid L within the inner cylinder 13 and the high-pressure gas G and the hydraulic liquid L within the reservoir 14 are prevented from leaking out to the outside.

As illustrated in FIG. 1, the piston rod 22 includes a main shaft portion 111 having a predetermined diameter to be in sliding contact with the rod seal portion 61 of the seal member 32 and the collar 86 of the rod guide 33, and an inner end shaft portion 112 at the end portion on the side inserted into the inner cylinder 13. The inner end shaft portion 112 has a smaller diameter than the main shaft portion 111, and has a male screw 113 formed on the side opposite to the main shaft portion 111. A nut 23 is screwed onto the male screw 113, and is sandwiched between the nut 23 and the main shaft portion 111 of the piston rod 22. The piston 17, disc valves 115 and 116 on opposite sides in the axial direction of the piston 17, a retainer 117 of the valve 115 on the rod guide 33 side, and a washer 119 of the disc valve 116 on the opposite side to the rod guide 33 are attached to the piston rod 22 by being sandwiched between the nut 23 and the main shaft portion 111 of the piston rod 22. The retainer 117 supports a rubber cushion 118 on the side opposite to the piston 17 in the axial direction.

The piston 17 includes a through hole 121 formed in the radial center thereof to penetrate the same in the axial direction and liquid passages 122 and 123 formed around the through hole 121 to penetrate the same in the axial direction. The inner end shaft portion 112 of the piston rod 22 is inserted into the through hole 121. The liquid passages 122 and 123 enable the lower chamber 19 on the side opposite to the rod guide 33 with respect to the piston 17 in the inner cylinder 13 and the upper chamber 18 on the rod guide 33 side with respect to the piston 17 in the inner cylinder 13 to communicate with each other.

In the piston 17, the disc valve 115 is disposed on the rod guide 33 side, and the disc valve 116 is disposed on the side opposite to the rod guide 33. The disc valve 115 is capable of opening and closing the liquid passage 122 in the piston 17, and the disc valve 116 is capable of opening and closing the liquid passage 123 in the piston 17.

The disc valve 115 allows the flow of the hydraulic liquid L through the liquid passage 122 from the lower chamber 19 to the upper chamber 18 side, while restricting the flow of the hydraulic liquid L in the opposite direction. When the piston rod 22 moves to the contraction side and the piston 17 moves to the lower chamber 19 side so that the pressure in the lower chamber 19 rises, the disc valve 115 opens the liquid passage 122 so as to cause the working liquid to flow from the lower chamber 19 to the upper chamber 18 and to generate a damping force at that time. The, the disc valve 115 is a contraction-side damping valve.

The disc valve 116 allows the flow of the hydraulic liquid L from the upper chamber 18 side to the lower chamber 19 through the liquid passage 123 while restricting the flow of the hydraulic liquid L in the opposite direction. When the piston rod 22 moves to the expansion side and the piston 17 moves to the upper chamber 18 side so that the pressure in the lower chamber 18 rises, the disc valve 116 opens the liquid passage 123 so as to cause the working liquid to flow from the upper chamber 18 to the lower chamber 19 and to generate a damping force at that time. That is, the disc valve 116 is an expansion-side damping valve.

Here, although illustration is omitted, when the piston rod 22 moves to the expansion side and the amount of protrusion from the cylinder 11 increases, the corresponding amount of the hydraulic liquid L is replenished from the reservoir 14 to the lower chamber 19 while opening the disc valve of the base valve. This disc valve is a suction valve that allows the hydraulic liquid L to flow from the reservoir 14 into the lower chamber 19 without substantially generating a damping force. On the contrary, when the piston rod 22 moves to the contraction side and the amount of insertion into the cylinder 11 increases, the corresponding amount of hydraulic liquid L flows from the lower chamber 19 to the reservoir 14 while opening the disc valve of the base valve. This disc valve is a damping valve that controls the flow of hydraulic liquid L from the lower chamber 19 to the reservoir 14 side and generates a damping force when the piston rod 22 moves to the contraction side and the piston 17 moves to the lower chamber 19 side so that the pressure in the lower chamber 19 rises.

When assembling the buffer 10, the piston rod 22 is inserted such that, for example, the piston 17, the disc valves 115 and 116, the retainer 117, and the washer 119, the nut 23, and the cushion 118 which are attached in advance are disposed in the inner cylinder 13 in the state in which the base valve (not illustrated) is attached to one end thereof, and the rod guide 33 is fitted to the other end side of the inner cylinder 13. A subassembly assembled in advance in this way is inserted into the outer cylinder 12 before the bent portion 27 is formed such that the base valve (not illustrated) is placed on the bottom portion (not illustrated). Then, the seal member 32 in the state of being supported on the piston rod 22 by inserting the piston rod 22 in advance is placed on the tip end portion of the rod guide 33 on the outer side in the cylinder inward-outward direction in the substrate portion 51 while the seal member 32 is fitted to the outer cylinder 12. Next, the washer 31 is placed on the substrate portion 51 of the seal member 32 while being fitted to the outer cylinder 12 and the fitting portion 66 of the seal member 32. In this state, the bent portion 27 is formed by caulking the end portion of the outer cylinder 12 on the opening 25 side inward in the radial direction while pressing the washer 31 to the inner side in the cylinder inward-outward direction. As a result, the bent portion 27 and the rod guide 33 are in the state of sandwiching the washer 31 and the substrate portion 51 of the annular body 41 of the seal member 32 therebetween.

In the buffers of Patent Documents 1 and 2 described above, a washer is provided on the outer side in the cylinder inward-outward direction of the seal member that seals the opening side of the outer cylinder, similarly to the buffer 10 of the first embodiment. That is, with a structure in which there is no washer and the seal member 32 is pressed directly at the time of assembly and the outer cylinder 12 is caulked, the seal member 32 may be warped and the sealing performance may be lowered. In order to suppress this warpage, a metal washer is provided outside the seal member for reinforcement.

In Patent Document 1, the rod guide is provided with a communication path from the cylinder to the reservoir. The buffer of Patent Document 2 is provided with a guide member for aligning the reinforcement washer. In both buffers of Patent Documents 1 and 2, since the rod guide is fitted to the outer cylinder and positioned in the radial direction, it is necessary to set the outer diameter of the rod guide to have a size to be capable of fitted to the outer cylinder, which becomes a causes of weight increase. The larger the diameter of the outer cylinder, the greater the weight of the rod guide formed through sintering.

The buffer 10 according to the first embodiment includes the bent cylindrical portion 52 bents along the rod guide 33 from the outer peripheral side of the annular body 41 provided between the washer 31 and the rod guide 33, and the outer cylinder seal portion 62 that seals the inner peripheral side of the outer cylinder 12 is provided in the bent cylindrical portion 52. Therefore, it is not necessary to press the outer cylinder seal portion 62 against the inner peripheral side of the outer cylinder 12 with the rod guide 33. Therefore, it is possible to enlarge the separation portion 94 provided over the entire circumference between the outer peripheral side of the rod guide 33 and the outer cylinder 12. Therefore, it is possible to reduce the weight of the rod guide 33, and to achieve weight reduction of the buffer 10.

In addition, with a structure in which the outer cylinder seal portion 62 is pressed against the inner peripheral side of the outer cylinder 12 using the rod guide 33, when the rod guide 33 is manufactured through sintering, there is a manufacturing restriction on the shape of the pressed portion, and thus there are also restrictions on the radial sectional area and the axial length of the outer cylinder seal portion 62. In contrast, in the buffer 10 of the first embodiment, the outer cylinder seal portion 62 is provided in the annular body 41 provided between the washer 31 and the rod guide 33. Thus, such restrictions are reduced, it is possible to increase the cross-sectional area of the outer cylinder seal portion 62 in the radial direction, and it is also possible to increase the axial length of the outer cylinder seal portion. Therefore, it is possible to improve the sealing performance of the outer cylinder seal portion 62.

In addition, since the rod guide 33 is positioned in the radial direction by the annular body 41, it is not necessary to fit the rod guide 33 to the outer cylinder 12. Therefore, it is possible to further reduce the weight of the rod guide 33, and to further reduce the weight of the buffer 10.

In addition, since the rod seal portion 61 and the outer cylinder seal portion 62 are provided integrally with the annular body 41, it is possible to reduce the number of components. Therefore, it is possible to reduce the reduction of these assembly man-hours.

The outer cylinder seal portion 62 may be integrally provided on the inner surface of the washer 31 on the inner side in the cylinder inward-outward direction, rather than on the annular body 41.

Second Embodiment

Figure 3:
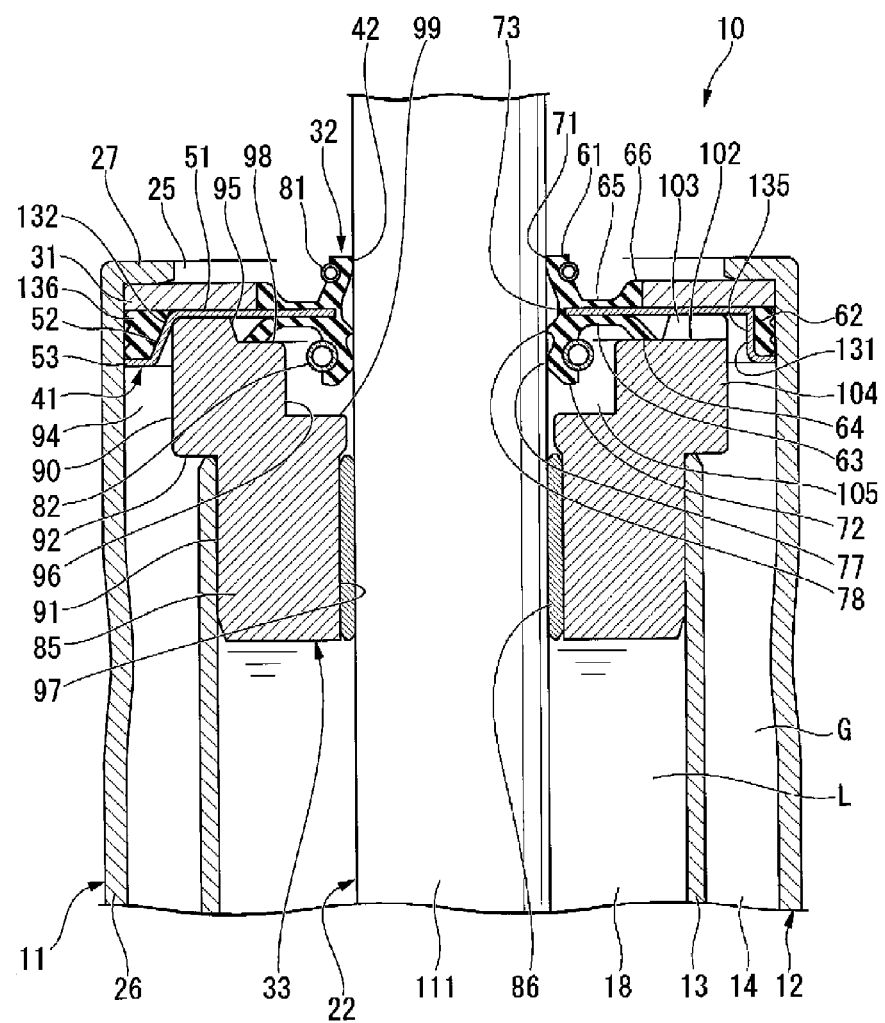
FIG. 3 is a partially enlarged cross-sectional view illustrating a buffer according to a second embodiment of the present disclosure.

Next, a second embodiment will be described mainly on the basis of FIG. 3, focusing on the differences from the first embodiment. In addition, components which are common to those of the first embodiment will be denoted using the same names and the same reference numerals.

In the second embodiment, a groove 131 is partially formed in the circumferential direction in the bent cylindrical portion 52 of the annular body 41 of the seal member 32. The groove 131 is recessed radially outward from the inner peripheral surface of a cylindrical body 132 except for the groove 131 in the bent cylindrical portion 52, and is formed over the entire axial length of the bent cylindrical portion 52. As a result, a recess 135 is also partially formed on the inner peripheral side of the outer cylinder seal portion 62 in the circumferential direction in alignment with the groove 131. The recess 135 is recessed radially outward from the inner peripheral surface of the seal body 136 except for the recess 135 of the outer cylinder seal portion 62, and is formed over the entire axial length of the outer cylinder seal portion 62.

In the second embodiment, the bent cylindrical portion 52 of the annular body 41 is positioned, that is, centered in the radial direction of the rod guide 33 by the cylindrical body 132.

Among the radial groove 103 and the axial groove 104 of the first embodiment, only the radial groove 103 is formed in the rod guide 33 in the second embodiment. In addition, the groove 131 in the seal member 32 is arranged so as to be aligned with the radial groove 103 and to be continuous with the radial groove 103, and the radial groove 103 and the groove 131 constitute a communication path 102 configured to cause the hydraulic liquid L to flow from the chamber 105 to the reservoir 14 when the check lip 64 opens.

According to the second embodiment, since it is not necessary to form an axial groove in the rod guide 33, it is easy to form the rod guide 33.

Third Embodiment

Figure 4:
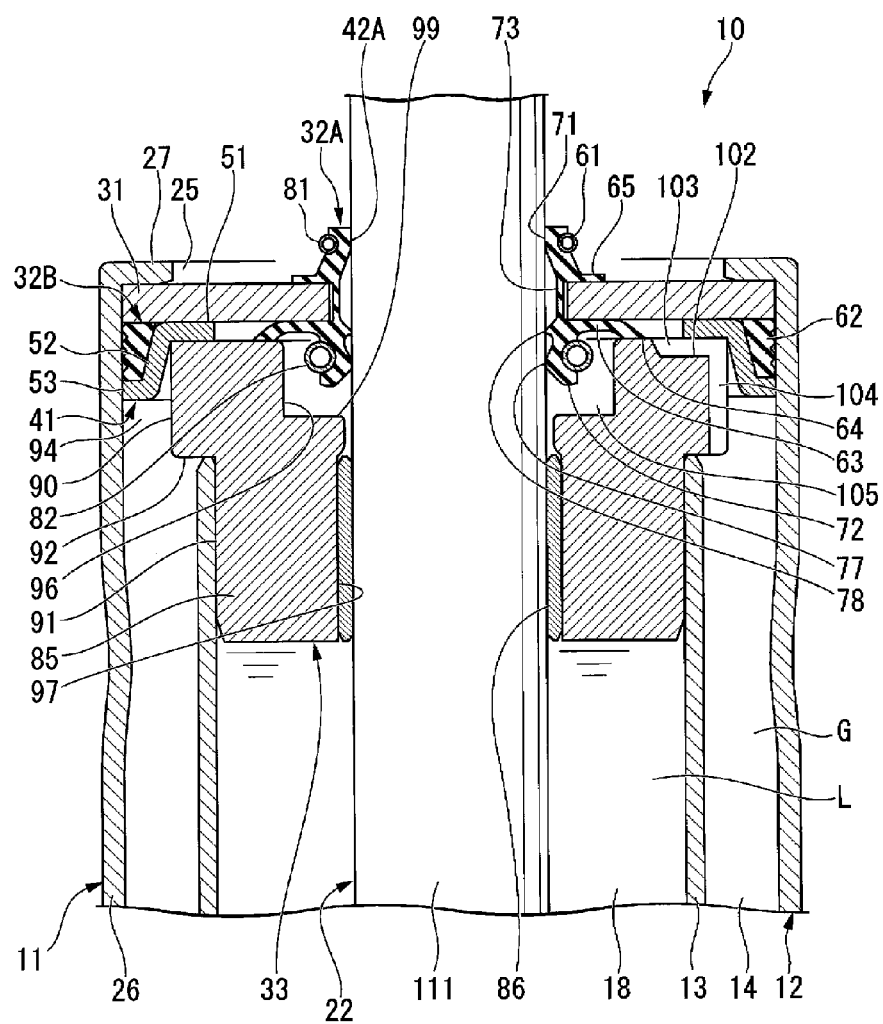
FIG. 4 is a partially enlarged cross-sectional view illustrating the buffer according to a third embodiment of the present disclosure.

Next, a third embodiment will be described mainly on the basis of FIG. 4, focusing on the differences from the first embodiment. In addition, components which are common to those of the first embodiment will be denoted using the same names and the same reference numerals.

In the third embodiment, the rod seal portion 61 having the dust lip 71, the oil lip 72, and the inner periphery covering portion 73 of the seal member 32 of the first embodiment, the inner surface covering portion 63, the check lip 64, and the outer surface covering portion 65 are integrally provided on the inner peripheral side of the washer 31 so as to constitute a seal member 32A. Therefore, the seal member 32A is an integrally molded product in which the rod seal portion 61, the inner surface covering portion 63, the check lip 64, and the outer surface covering portion 65 are baked on the metal washer as a rubber elastic body 42A.

In the third embodiment, the annular washer 31 that abuts on the bent portion 27 of the outer cylinder 12 has an inner diameter smaller than that of the first embodiment.

The rod seal portion 61 of the third embodiment is also provided in the outer cylinder 12 on the one end side from which the piston rod 22 of the rod guide 33 protrudes (that is, the outer side in the cylinder inward-outward direction). In the rod seal portion 61 of the third embodiment, the dust lip 71 provided on the outer side in the cylinder inward-outward direction extends in a tapered shape from the inner peripheral side of the washer 31 to the outer side in the cylinder inward-outward direction. The base end surface of the dust strip 71, which is in contact with the washer 31, is entirely bonded to the surface of the washer 31 on the outer side in the cylinder inward-outward direction over the entire circumference thereof.

In the rod seal portion 61 of the third embodiment, the oil lip body 77 of the oil lip 72 provided on the inner side in the cylinder inward-outward direction extends in a tapered shape from the inner peripheral side of the washer 31 to the inner side in the cylinder inward-outward direction. The base end surface of the oil lip body 77, which is in contact with the washer 31, is entirely bonded to the inner surface of the washer 31 on the inner side in the cylinder inward-outward direction over the entire circumference thereof.

In the rod seal portion 61 of the third embodiment, the inner periphery covering portion 73 connects the dust lip 71 and the oil lip 72 while covering the inner peripheral side of the washer 31. The outer peripheral surface of the inner periphery covering portion 73, which is in contact with the washer 31, is entirely bonded to the inner peripheral surface of the washer 31 over the entire circumference thereof.

The inner surface covering portion 63 of the third embodiment extends radially outward from the base end side of the oil lip body 77, and the surface thereof, which is in contact with the washer 31, is entirely bonded to the inner surface of the washer 31 on the inner side in the cylinder inward-outward direction over the entire circumference thereof, and partially covers this inner surface.

The check lip 64 of the third embodiment extends from the washer 31 while expanding the diameter on the inner side in the cylinder inward-outward direction. The surface of the check lip 64, which is in contact with the washer 31, is entirely bonded to the inner surface of the washer 31 on the inner side in the cylinder inward-outward direction over the entire circumference thereof.

The outer surface covering portion 65 of the third embodiment extends radially outward from the base end side of the dust lip 71. The surface of the outer surface covering portion 65, which is in contact with the washer 31, is entirely bonded to the outer surface of the washer 31 on the outer side in the cylinder inward-outward direction over the entire circumference thereof, and partially covers this outer surface.

In the third embodiment, the outer cylinder seal portion 62 of the seal member 32 of the first embodiment is provided integrally with the metal annular body 41 so as to constitute the seal member 32B. Therefore, the seal member 32B is an integrally formed product in which the outer cylinder seal portion 62, which is a rubber elastic body, is baked on the metal annular body 41, and is separate from the seal member 32A.

The annular body 41 of the third embodiment is press-molded from a metal plate having a predetermined thickness that is larger than that of the first embodiment. The annular body 41 of the third embodiment includes a perforated-disc-shaped substrate portion 51 having an inner diameter larger than that of the first embodiment, a bent cylindrical portion 52 and an outer peripheral plate portion 53, which are similar to those of the first embodiment. The outer cylinder seal portion 62 is bonded to the bent cylindrical portion 52 and the outer peripheral plate portion 53 of the annular body 41 as in the first embodiment.

In the third embodiment, the rod guide body 85 of the rod guide 33 does not have the large-diameter inner peripheral portion 95 and the stepped portion 98 of the first embodiment, and the check lip 64 of the seal member 32A is in contact with the tip end portion of the rod guide body 85 on the outer side in the cylinder inward-outward direction with interference. In the tip end portion of the rod guide body 85 on the outer side in the cylinder inward-outward direction, the radial groove 103 of the communication passage 102 is formed on the radially outer side from the range where the check lip 64 abuts.

According to the third embodiment, the rod seal portion 61, the inner surface covering portion 63, the check lip 64, the outer surface covering portion 65, and the washer 31 are integrally provided so as to constitute the seal member 32A, and the outer cylinder seal portion 62 and the annular body 41 are integrally provided so as to constitute the seal member 32B, the flexibility in designing each of the seal members 32A and 32B is increased.

Fourth Embodiment

Figure 5:
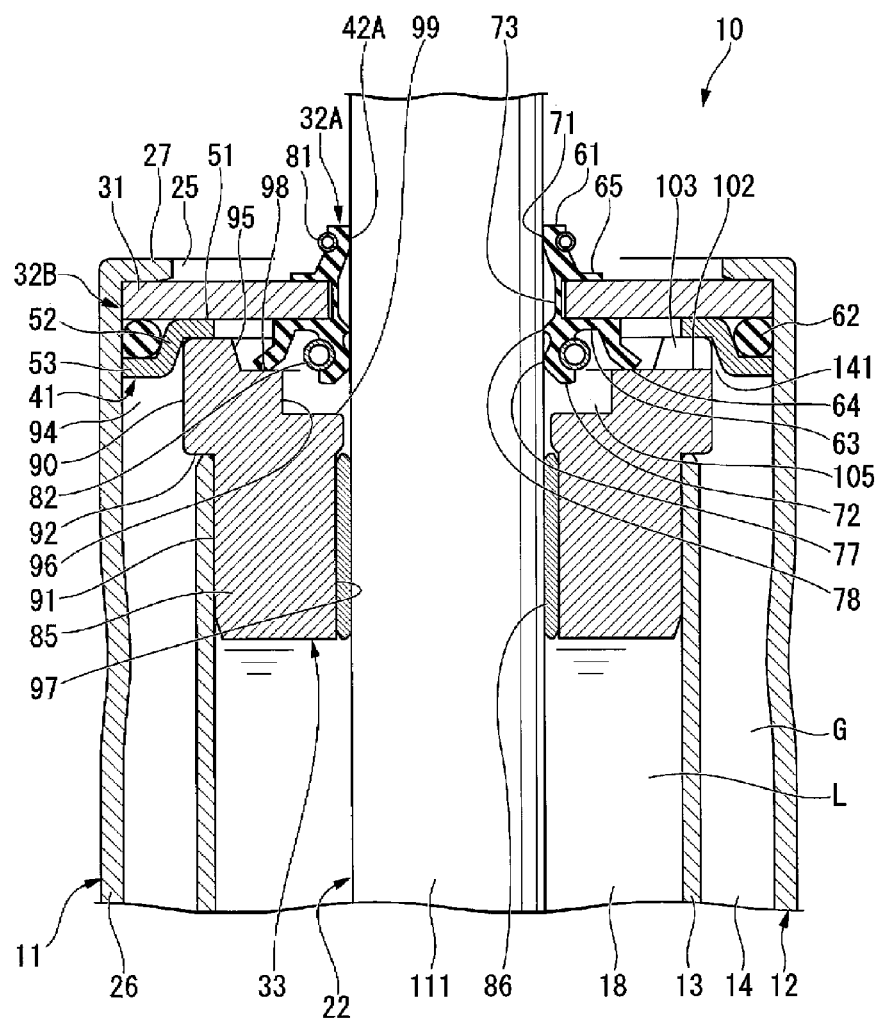
FIG. 5 is a partially enlarged cross-sectional view illustrating the buffer according to a fourth embodiment of the present disclosure.

Next, a fourth embodiment will be described mainly on the basis of FIG. 5, focusing on the differences from the first and third embodiments. In addition, components which are common to those of the first and third embodiments will be denoted using the same names and the same reference numerals.

In the fourth embodiment, a large-diameter inner peripheral portion 95 and a stepped portion 98 similar to those in the first embodiment are formed on the rod guide main body 85 of the rod guide 33, and a check lip 64 of a seal member 32A similar to that of the third embodiment is capable of coming into sealing contact with the stepped portion 98 over the entire circumference thereof with predetermined interference.

In addition, in the fourth embodiment, the sealing member 32B includes an annular body 41 similar to that of the third embodiment, and an outer cylinder seal portion 62 arranged on the radially outer side of the bent cylinder portion 52 of the annular body 41 separately from the annular body 41. The outer cylinder seal portion 62 is an O-ring. That is, the seal member 32B of the fourth embodiment includes a separate annular body 41 and an outer cylinder seal portion 62.

Among the radial groove 103 and the axial groove 104 similar to those of the first embodiment, only the radial groove 103 is formed in the rod guide 33 in the fourth embodiment. A radial gap 141, which is formed between the bent cylindrical portion 52 and the large-diameter outer peripheral portion 90 of the rod guide 33 since the bent cylindrical portion 52 of the annular body 41 has a tapered shape in which the diameter increases toward the inner side in the cylinder inward-outward direction, is continuous with the radial groove 103, and the radial groove 103 and the radial gap 141 constitute a communication path 102 that allows the hydraulic liquid L to flow from the chamber 105 to the reservoir 14 when the check lip 64 opens.

According to the fourth embodiment, since the outer cylinder seal portion 62 made of a separate O-ring is disposed on the bent cylindrical portion 52 of the press-molded annular body 41, it is possible to reduce component costs.

In the first to fourth embodiments, the rod guide 33 and the outer cylinder 12 may be separated from each other in the radial direction at least on the opening 25 side of one end of the outer cylinder 12. Even in this case, the bent cylindrical portion 52 on the outer peripheral side of the annular body 41 is bent and extends to the portion where the rod guide 33 and the outer cylinder 12 are radially separated from each other, and the outer cylinder seal portion 62 is provided on the outer peripheral side of the bent cylindrical portion 52.

In a first aspect of the embodiments described above, a buffer includes: an outer cylinder configured to enclose a working fluid therein; an inner cylinder configured to enclose a working fluid therein and provided on an inner peripheral side of the outer cylinder so as to form an annular reservoir between the inner cylinder and the outer cylinder; a piston slidably fitted in the inner cylinder; a piston rod having one end side protruding outward from the outer cylinder and a remaining end side inserted into the inner cylinder and coupled to the piston; a cylindrical rod guide provided on one end side of the inner cylinder so as to slidably guide the piston rod; a first seal portion provided on the one end side of the rod guide within the outer cylinder and configured to seal an outer peripheral side of the piston rod; a second seal portion provided on the one end of the rod guide within the outer cylinder and configured to seal the inner peripheral side of the outer cylinder; a washer provided on the one end side of the rod guide within the outer cylinder; and a bent portion formed by bending an one end side of the outer cylinder radially inward toward the washer and configured to fix the washer. An annular body is provided between the washer and the rod guide in an axial direction, the first seal portion is provided on an inner peripheral side of the washer or an inner peripheral side of the annular body, the rod guide and the outer cylinder are radially spaced apart from each other at least on the one end side of the outer cylinder, an outer peripheral side of the annular body has a bent portion bent and extending in a portion where the rod guide and the outer cylinder are radially spaced apart from each other, and the second seal portion is provided on an outer peripheral side of the bent portion. As described above, since there is provided the bent portion which is bent and extends from the outer peripheral side of the annular body provided between the washer and the rod guide to the portion where the rod guide and the outer cylinder are radially spaced apart from each other, and the second seal portion configured to the inner peripheral side of the outer cylinder is provided on the bent portion, it is not necessary to press the second seal portion against the inner peripheral side of the outer cylinder with the rod guide. Therefore, it is possible to enlarge the space provided over the entire circumference between the outer peripheral side of the rod guide and the outer cylinder. Therefore, it is possible to reduce the weight of the rod guide and the weight of the buffer.

According to a second aspect, in the first aspect, the rod guide is radially positioned by the annular body. Thus, the rod guide does not have to be fitted to the outer cylinder, and it is possible to further reduce the weight of the rod guide and the weight of the buffer.

According a third aspect, in the first or second aspect, the first seal portion is provided integrally with the annular body. Thus, it is possible to reduce the number of assembly steps of the first seal portion and the annular body.

According a fourth aspect, in the first or second aspect, the first seal portion is provided integrally with the washer. Thus, it is possible to reduce the number of assembly steps of the first seal portion and the annular body.

According a fifth aspect, in the first or second aspect, the second seal portion is an O-ring disposed on the bent portion. Thus, it is possible to reduce components costs.

Although the structure in which the separation portion 94 is provided in the entire circumference of the rod guide 33 has been illustrated. Without being limited thereto, however, a flange may be provided, for example, on the inner cylinder 13 side of the rod guide 33 so as to be in contact with the outer cylinder 12. This enables the rod guide 33 to be centered and assembly property to be improved. However, it is desirable to omit the flange from a viewpoint of weight reduction.

INDUSTRIAL APPLICABILITY

According to the present disclosure, weight reduction is enabled.

DESCRIPTION OF SYMBOLS

10: buffer
12: outer cylinder
13: inner cylinder
14: reservoir
17: piston
22: piston rod
27: bent portion
31; washer
33: rod guide
41: annular body
52: bent cylindrical portion (bent portion)
61: rod seal portion (first seal portion)
62: outer cylinder seal portion (second seal portion)
94; separation portion
G: gas (working fluid)
L: hydraulic liquid (working fluid)

The invention claimed is:

1. A buffer comprising:
an outer cylinder configured to enclose a working fluid therein;
an inner cylinder configured to enclose the working fluid therein and provided on an inner peripheral side of the outer cylinder so as to form an annular reservoir between the inner cylinder and the outer cylinder;
a piston slidably fitted in the inner cylinder;
a piston rod having one end side protruding outward from the outer cylinder, and a remaining end side inserted into the inner cylinder and coupled to the piston;
a cylindrical rod guide provided on one end side of the inner cylinder so as to slidably guide the piston rod, a part of an outer peripheral portion of the rod guide being configured to directly abut the inner cylinder;
a first seal portion provided on one end side of the rod guide within the outer cylinder and configured to seal an outer peripheral side of the piston rod;
a second seal portion provided on the one end of the rod guide within the outer cylinder and configured to seal the inner peripheral side of the outer cylinder;
a washer provided on the one end side of the rod guide within the outer cylinder; and
a first bent portion formed by bending a one end side of the outer cylinder radially inward toward the washer and configured to fix the washer,
wherein an annular body is provided between the washer and the rod guide in an axial direction,
the first seal portion is provided on an inner peripheral side of the washer or an inner peripheral side of the annular body,
the rod guide is radially spaced apart from the outer cylinder over an entire circumference and an entire length of the rod guide,
the annular body includes:
a second bent portion formed to bend and extend to a portion where the rod guide and the outer cylinder are radially spaced apart from each other; and
an outer peripheral plate portion formed radially outside of the second bent portion to abut an inner peripheral surface of the outer cylinder,
the second seal portion is provided on an outer peripheral side of the second bent portion, and the rod guide abuts an inner peripheral surface of the second bent portion of the annular body to be radially positioned by the second bent portion of the annular body.

2. The buffer according to claim 1, wherein the first seal portion is provided integrally with the annular body.

3. The buffer according to claim 1, wherein the first seal portion is provided integrally with the washer.

4. The buffer according to claim 1, wherein the second seal portion is an O-ring disposed on the second bent portion.

* * * * *